March 20, 1945.	W. K. MILLHOLLAND	2,371,906
MULTIPLE-OPERATION MACHINE ASSEMBLY
Filed Feb. 11, 1943	3 Sheets-Sheet 1
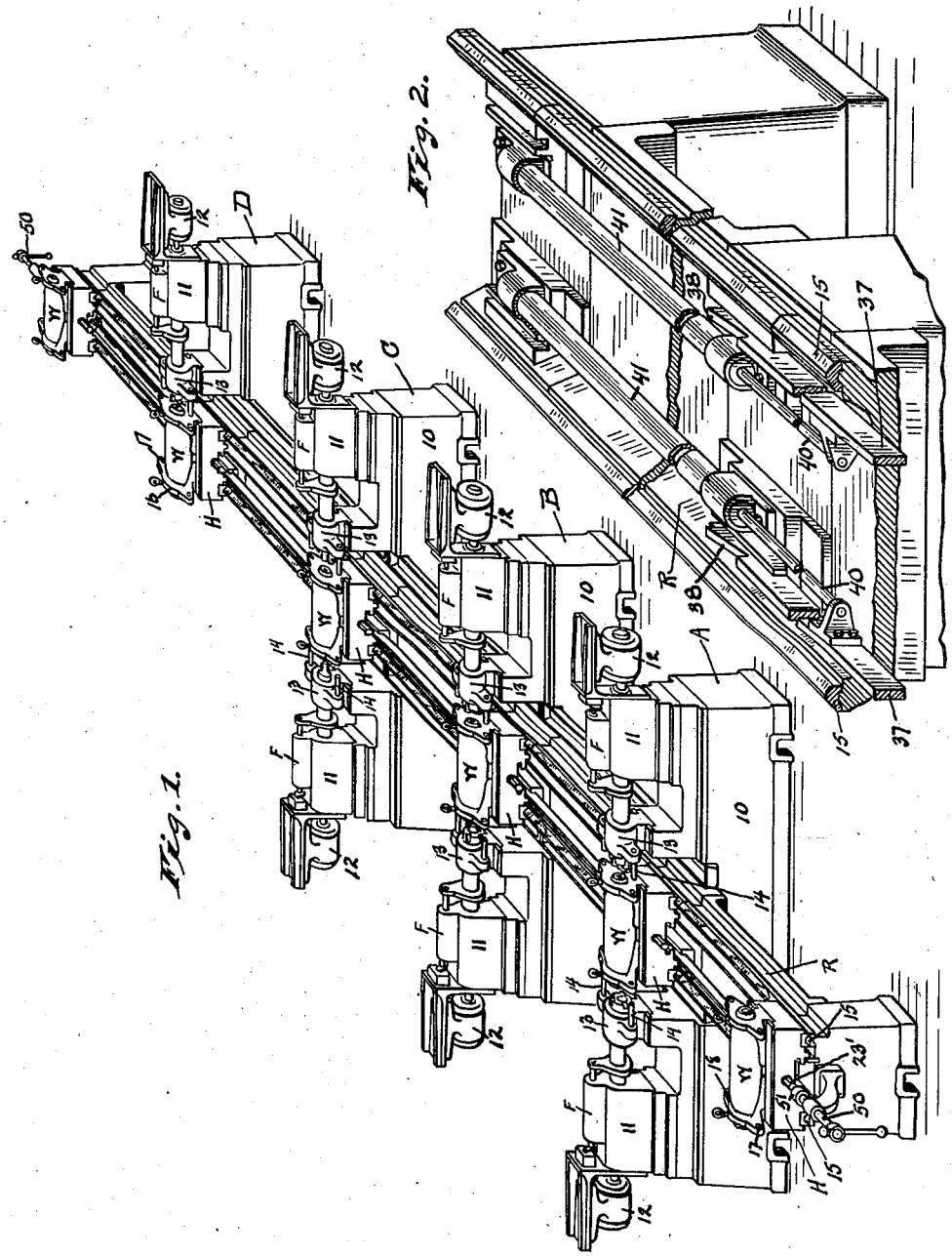
INVENTOR.
William K. Millholland,
BY
Hood & Hahn
ATTORNEYS.

March 20, 1945. W. K. MILLHOLLAND 2,371,906
MULTIPLE-OPERATION MACHINE ASSEMBLY
Filed Feb. 11, 1943   3 Sheets-Sheet 2

INVENTOR.
WILLIAM K. MILLHOLLAND,
BY Hood & Hahn
ATTORNEYS.

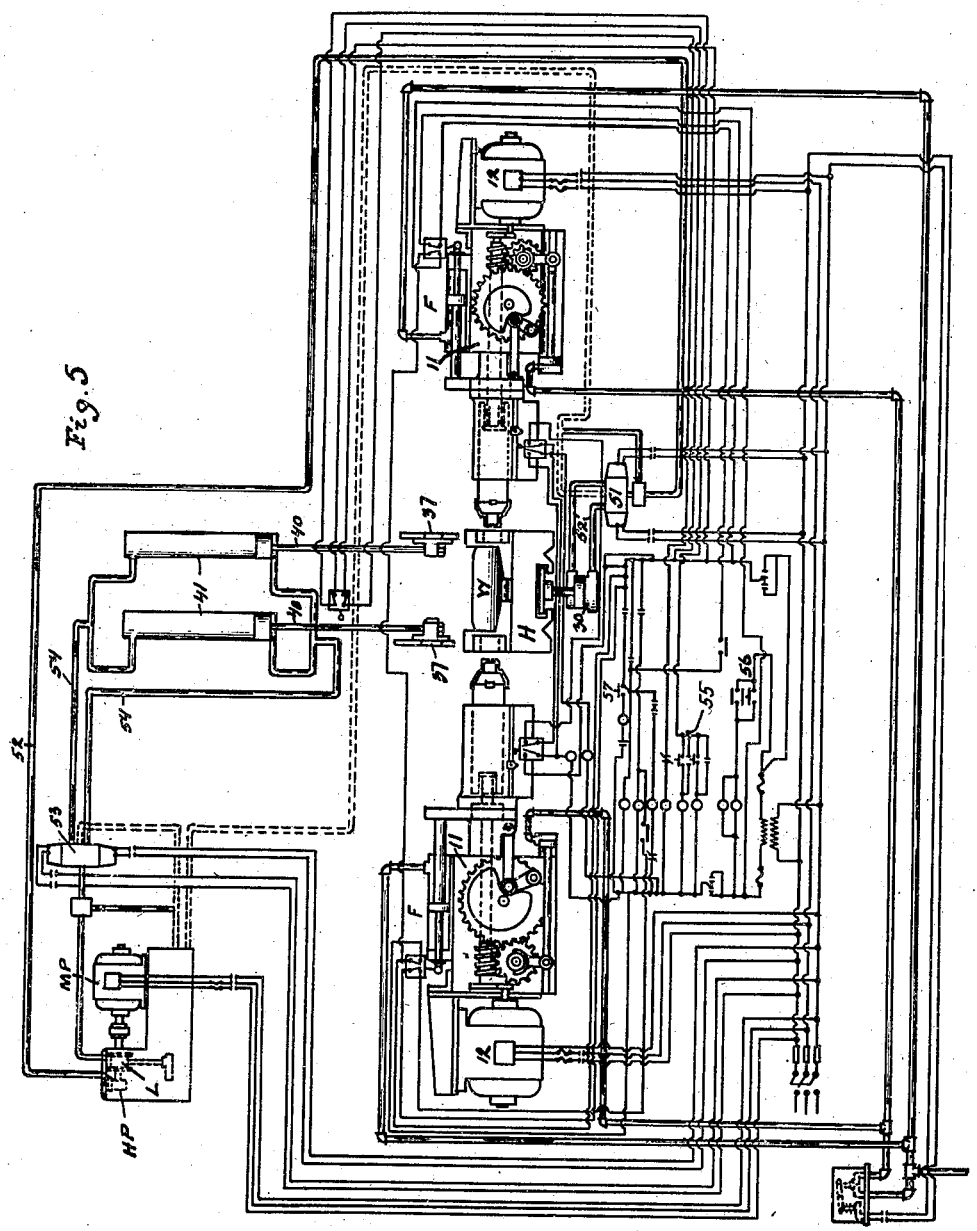

Patented Mar. 20, 1945

2,371,906

UNITED STATES PATENT OFFICE 2,371,906

MULTIPLE-OPERATION MACHINE
ASSEMBLY

William K. Millholland, Indianapolis, Ind.

Application February 11, 1943, Serial No. 475,483

2 Claims. (Cl. 29—33)

The fabrication of large and heavy articles, such as large bombs, which require a multiplicity of accurate machining operations, has heretofore involved, as a considerable item of expense, not only the transfer of the article from one machine to another but also the successive accurate indexing of the article with the successive manipulative machines, all of which is time consuming and expensive and offers repeated opportunities for spoilage due to inaccuracies of indexing.

The object of my invention is to provide improved means by which production of such bulky, heavy articles requiring accurate machining may be accomplished at much greater speed and at less cost than heretofore.

The accompanying drawings illustrate an embodiment of my invention.

Fig. 1 is a perspective view of an embodiment of my invention;

Fig. 2 is a section perspective, on a larger scale, of the work-holder advancing means;

Figure 4:
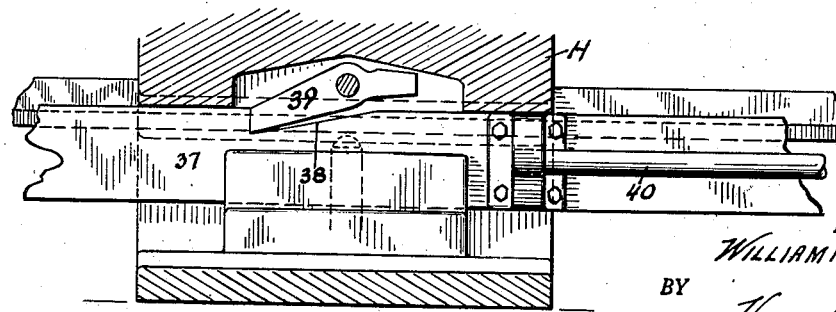

Fig. 4 a fragmentary longitudinal section showing the work-holder advancing means; and Fig. 5 is a wiring diagram.

In the drawings A, B, C, D indicate a series of machine tools each capable of automatically performing one or more of the desired machining operations to which the work pieces are to be subjected. In the drawings, machines A, B, C are indicated as of the twin type, comprising a bed 10 with two automatic machining units 11, 11 axially spaced sufficiently to permit work-holders H to pass therebetween, while machine D is a single unit type. Each machining unit 11 is actuated by its individual motor 12 and comprises an indexing head 13 slidable axially of the unit and provided with parallel indexing pins 14, 14. Machining units of this type are well known in the art (see, for instance, my Patents Nos. 1,841,546 and 1,849,683) and vary in detail according to the operations to be performed. Such units, quite commonly, may be started by the closing of an energizing circuit, whereupon they operate through a cycle and automatically come to rest at their initial position.

The several machines A, B, C, D (as many as may be needed) are arranged side-by-side with the spaces between their units 11, 11 in a straight-line series and through these spaces is extended a work-holder runway R (comprising parallel tracks 15, 15) which unifies the several machines. Runway R is adapted to receive, support, and guide, a plurality of work-holders H, each of which comprises indexing elements 16 having indexing perforations 17 adapted to receive indexing pins 14.

Figure 3:
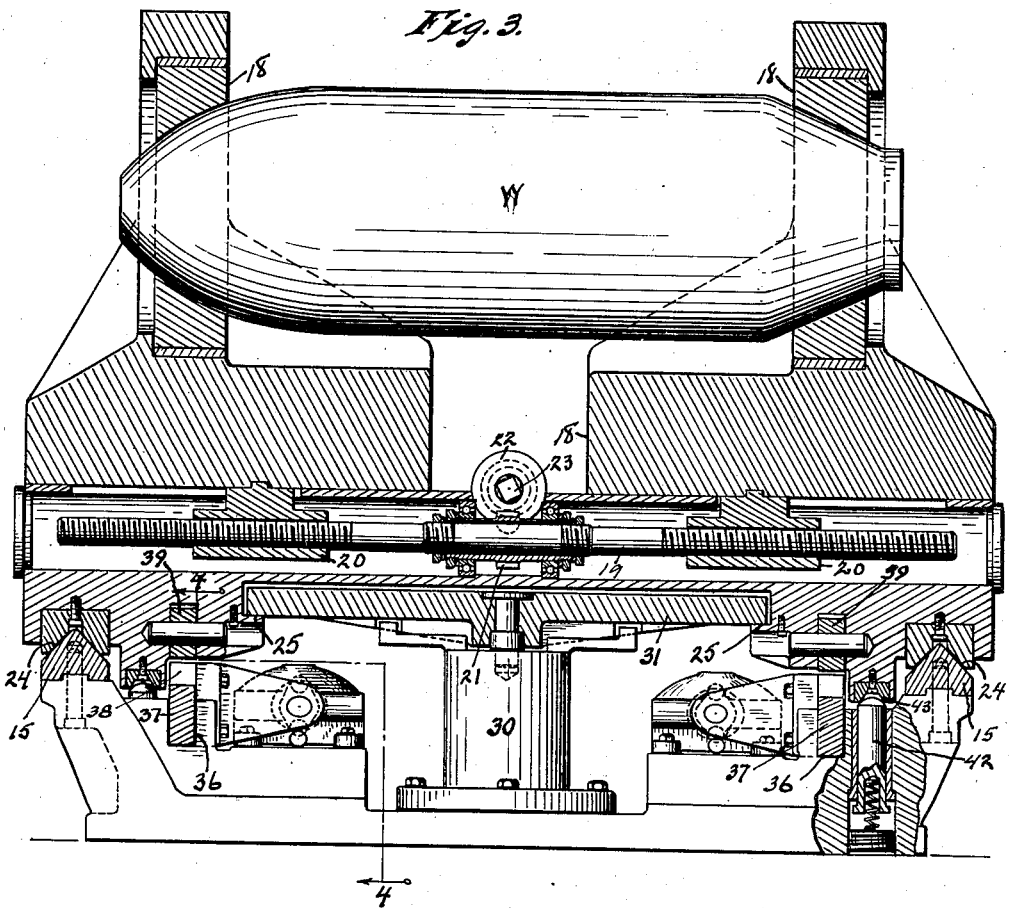
Fig. 3 is a transverse vertical section on a larger scale.

Each work-holder H comprises suitable work-clamping elements 18, such as the illustrated sliding heads, and means for clamping them upon, and releasing them from, the work-pieces W. In the present instance this clamping means comprises the oppositely-threaded shaft 19, threaded into nuts 20 carried by elements 18, and provided with a worm gear 21 meshing with a worm 22 carried by a shaft 23 journalled in the main body of holder H and having a polygonal end 23′ by which it may be manipulated. Each work-holder H is provided with track grooves 24 to ride upon tracks 15, and with upwardly presented shoulders 25 (Fig. 3) parallel with grooves 24.

Each machine bed 10 is provided with a vertical fluid pressure cylinder 30, the piston of which carries a clamping bar 31, beneath the opposite ends of which the shoulders 25 may pass as the work-holder H traverses tracks 15, the arrangement being such that when a work-holder is in proper position relative to any one of the machining units 11, a clamp bar 31 may be forcibly drawn down upon shoulders 25 to firmly hold the work-holder during machining operations performed by the adjacent unit 11.

Paralleling tracks 15, in runway R, are two grooves 36, 36 in each of which is slidably mounted a feed bar 37 provided with a plurality of notches 38 equal in number to the number of units A to D plus two, these being adapted to receive pawls 39 carried by the work-holders H. Feed bars 37 are reciprocated by pistons 40, 40 of hydraulic cylinders 41, 41 mounted in runway R.

Each machine bed 10 is provided with a vertically reciprocable spring-biased preliminary-indexing pin 42, the upper end of which is adapted to seat in pockets 43, 43 formed in holders H in such manner as to slightly obstruct, but not prevent, movement of the holders along tracks 15. These preliminary-indexing pins 42 and their cooperating pockets 43 are so located that they serve to approximately locate the work-holders so that the indexing pins 14 may be projected into perforations 17 of the work-holders, for final indexing of the work-holders preliminary to operation of the machining units 11. Each of the units 11 is provided with its own motor 12 and is of an automatic or semi-automatic type, the details of which form no part of my present invention.

The individual work-pieces W are mounted in individual work-holders H either at a distant point and deposited as a unit on the receiving end of the runway R, and similarly removed as a unit from the discharge end of the runway, or, if desired, clamp operating means, such as hand shaft 50 equipped with socket 51 to engage end 23', may be provided at the receiving and discharge ends of the runway, as shown in Fig. 1.

As previously stated, my invention contemplates operations on comparatively large work-pieces, such as large bombs or housings not easily lifted by hand and consequently, the units A and D will be relatively large and cumbersome requiring considerable floor space if individually operated, but, in accordance with my invention, these large units are placed side-by-side, closely adjacent, with just enough space between to permit necessary movements of the operator (as distinguished from space which would be required if the work were to be individually brought to and removed from the machining unit). As a consequence, the amount of floor space required for the complete machining operations to be performed on the heavy work-pieces, as well as the time required to complete the required machining operations, is reduced to a minimum without chance of decrease of accuracy in the finished product.

Whether the initiation of movements of units 11, the operations of the clamping bars 31, and reciprocations of feed bars 37 are all synchronized or independently accomplished, will be a matter of choice. In any event, the provision of necessary electrical circuits, fluid pressure lines, and controlling valves therefor, is a matter well within present engineering skill once the general layout, as above described, has been disclosed.

As a suggested system of wiring, Fig. 5 of the drawings is a diagram of appropriate pneumatic, hydraulic, and electrical connections for one pair of units 11, by means of which necessary movements of the parts of my apparatus may be controlled and synchronized. Each of the units 11 includes an electric motor 12, movement of which serves to automatically project indexing pins 14 to active position and to actuate the machining elements of unit 11, and fluid pressure means F acting to bias said pins 14 and associate machining elements to at rest positions.

The source P of fluid pressure includes a motor MP, a high pressure pump HP connected through valves 51 and pipes 52 with cylinders 30, and a low pressure pump L connected through valve 53 and pipes 54 with cylinders 41. Closing of switch 56 starts all motors 12 and MP. Closing of switch 55 causes actuation of the feed bars 37 to shift the several work-holders to new positions, whereupon closing of switch 57 starts cycle of operations.

I claim as my invention:

1. A plurality of machine tool units arranged side-by-side and each comprising machining elements movable toward and from a vertical plane intersecting all of said units, a runway arranged parallel with said plane and transversely of said several units and extending beyond the end units, a plurality of work-holders removably and slidably mounted on said runway, means by which the several work-holders on the runway may be simultaneously advanced thereon from one unit to the next unit, cooperating indexing means carried respectively by each work-holder and each machining unit for registering each work-holder successively with the several machining units, each machine-unit indexing means being movable to cooperative relation with a work-holder prior to engagement of the machine unit with the work carried by the adjacent work-holder, each work-holder being formed, on its under side, to present an upwardly facing surface, means associated with said runway adjacent each machining unit and positioned to overlie said surface when a work-holder is indexed with such unit, and means for forcing said last-named means downwardly to clamp such work-holder in position on said runway.

2. A plurality of machine tool units arranged side-by-side and each comprising machining elements movable toward and from a vertical plane intersecting all of said units, a runway arranged parallel with said plane and transversely of said several units and extending beyond the end units, a plurality of work-holders removably and slidably mounted on said runway, means by which the several work-holders on the runway may be simultaneously advanced thereon from one machining unit to the next succeeding unit, cooperating indexing means carried respectively by each work-holder and each machining unit for registering each work-holder successively with the several machining units, each work-holder being formed on its under side with a pair of oppositely laterally extending grooves opening toward each other, a plate reciprocably mounted between the lateral edges of said runway adjacent each of said machining units, the lateral edges of each of said plates being positioned to enter the said grooves of a work-holder as the same approaches indexing relation with an associated machining unit, and means for forcing said plates downwardly to clamp their engaged work-holders immovably in place on said runway.

WILLIAM K. MILLHOLLAND.